US010093082B2

(12) United States Patent
Hütt et al.

(10) Patent No.: US 10,093,082 B2
(45) Date of Patent: Oct. 9, 2018

(54) TRANSPARENT POLYOLEFIN FILM (71) Applicant: Treofan Germany GmbH & Co. KG, Neunkirchen (DE)

(72) Inventors: Detlef Hütt, Heusweiler (DE); Mathias Roth, Zweibrücken (DE)

(73) Assignee: Treofan Germany GmbH & Co. KG, Neunkirchen (DE)

( * ) Notice: Subject to any disclaimer, the term of this patent is extended or adjusted under 35 U.S.C. 154(b) by 0 days.

(21) Appl. No.: 15/522,595

(22) PCT Filed: Oct. 29, 2015

(86) PCT No.: PCT/EP2015/002163
§ 371 (c)(1),
(2) Date: Apr. 27, 2017

(87) PCT Pub. No.: WO2016/066268
PCT Pub. Date: May 6, 2016

(65) Prior Publication Data
US 2017/0334181 A1    Nov. 23, 2017

(30) Foreign Application Priority Data
Oct. 30, 2014 (DE) .................. 10 2014 015 929

(51) Int. Cl.
*B32B 27/32* (2006.01)
*B32B 27/18* (2006.01)
*B32B 27/08* (2006.01)
*B65D 65/40* (2006.01)

(52) U.S. Cl.
CPC ............. *B32B 27/32* (2013.01); *B32B 27/08* (2013.01); *B32B 27/18* (2013.01); *B65D 65/40* (2013.01);
(Continued)

(58) Field of Classification Search
CPC ......... B32B 27/32; B32B 27/18; B32B 27/08; B32B 2250/03; B32B 2250/242;
(Continued)

(56) References Cited

U.S. PATENT DOCUMENTS 4,622,237 A    11/1986 Lori
4,666,778 A    5/1987 Hwo
(Continued)

FOREIGN PATENT DOCUMENTS

DE    3801535 A1    7/1988
EP    0236945 A2    9/1987
(Continued)

OTHER PUBLICATIONS

International Search Report for PCT/EP2015/002163 dated Jan. 22, 2016.
(Continued)

*Primary Examiner* — Michael C Miggins
(74) *Attorney, Agent, or Firm* — Drinker Biddle & Reath LLP (57) ABSTRACT The invention relates to a peelable, transparent multilayered polyolefin film having a first cover layer I and a second sealable cover layer II. The cover layer I contains a mixture of propylene copolymers and/or propylene terpolymers and an ethylene-butylene copolymer and has a roughness of 0.1 to <2 μm. The second sealable cover layer II contains propylene homopolymers and propylene copolymers II having a seal initiation temperature of 105 to 135° C.

11 Claims, 1 Drawing Sheet

(52) U.S. Cl.
CPC ..... *B32B 2250/03* (2013.01); *B32B 2250/242* (2013.01); *B32B 2307/31* (2013.01); *B32B 2307/412* (2013.01); *B32B 2307/518* (2013.01); *B32B 2307/748* (2013.01); *B32B 2553/00* (2013.01)

(58) Field of Classification Search
CPC .......... B32B 2307/31; B32B 2307/412; B32B 2307/518; B32B 2307/748; B32B 2553/00; B65D 65/40
See application file for complete search history.

(56) References Cited

U.S. PATENT DOCUMENTS

| | | |
|---|---|---|
| 5,366,796 A | 11/1994 | Murschall et al. |
| 5,453,260 A | 9/1995 | Nakazawa et al. |
| 5,500,265 A | 3/1996 | Ambroise et al. |
| 5,817,412 A | 10/1998 | Lohmann et al. |
| 5,997,968 A | 12/1999 | Dries et al. |
| 2012/0308773 A1 | 12/2012 | Hütt |

FOREIGN PATENT DOCUMENTS

| | | |
|---|---|---|
| EP | 0538747 A1 | 4/1993 |
| EP | 0775574 A2 | 5/1997 |
| EP | 0781652 A2 | 7/1997 |
| WO | WO-2011092001 A1 | 8/2011 |

OTHER PUBLICATIONS

Written Opinion of the International Searching Authority for PCT/EP2015/002163 dated Jan. 22, 2016.

TRANSPARENT POLYOLEFIN FILM

CROSS-REFERENCE TO RELATED APPLICATIONS

This application is a national stage application (under 35 U.S.C. § 371) of PCT/EP2015/002163, filed Oct. 29, 2015, which claims benefit of German Application No. 10 2014 015929.9, filed Oct. 30, 2014, both of which are incorporated herein by reference in their entirety.

The present invention relates to a peelable, transparent, multilayered polyolefin film formed of at least three layers. The invention also relates to a method for producing the peelable multilayered film, and use thereof.

Polyolefin films are widely used as packaging films. The success of these materials is based on the good optical and mechanical properties and on the good sealing properties. Sealable films have a cover layer made of a polymer which has a lower crystalline melting point than the polymers of the base layer of the film. For sealing, the film layers are arranged one on top of the other and are heated to 10 to 20° C. below the crystalline melting point, i.e. the cover layers are not completely melted, but form a sealing seam of high strength.

The sealing seams in many cases have a higher mechanical strength than the films themselves, so that when opening a sealed film package this is torn not only in the sealing seam. Often, the tear propagates in the film itself, whereby the film tears further uncontrollably. For this reason, so-called peelable cover layers are applied to film surfaces instead of sealable raw materials. There is then a sealing of the peelable cover layers against one another. This seal provides sufficient strength, but simultaneously also the possibility of opening the sealing seam again in a controlled manner without destroying the sealed film. This opening of the peel seam is then provided ideally only in the peeling layer.

Peelable raw materials are known in the prior art. For example, the product data sheet "Novolen VP 9201" describes an olefinic polymer which is suitable for the preparation of peelable coextruded seal layers on polypropylene films. The sealable peel layers are glossy to satin matt and are mainly used on pigmented/opaque base layers, since the compressibility of the vacuole-containing base layer contributes to good sealing and peeling properties.

In essence, the strength of a sealing seam is also dependent on the temperature at which the sealing takes place. This is not a problem in normal sealable films, as in this application a sufficiently strong sealing seam is achieved by maintaining a minimum temperature during sealing. Higher temperatures during sealing lead to higher sealing seam strengths, but do not have any disadvantage. In contrast, the strict observance of a very narrow temperature range during the sealing is required when sealing peelable cover layers, since too high a strength of the sealing seam has an adverse effect on the peelability. On the other hand a sufficient strength of the seal must still be ensured so that the packaging provides sufficient protection. The processing of the peelable films to form a packaging is therefore critical and requires a very good control of the temperature at which the sealing is performed. Additionally, variations in the structure or the quality of the film, for example unevenenesses in the thickness of the cover layers, have a direct effect on the quality of the sealing seam and may result in a too low or too high strength of the sealing seam. The quality of the packaging is then also not consistent. These problems are altogether much more critical in the case of transparent peel films, since no vacuole-containing base layer mitigates the effects.

U.S. Pat. No. 4,666,778 describes transparent, peelable films with good sealing seam strength and a low haze. The peelable cover layer consists of a polymer mixture of ethylenic polymers or ethylenic copolymers with small amounts of propylene polymers and butylene polymers. The transparency of the films is sufficient for some applications, but requires improvement in general.

EP-A-0 538 747 describes biaxially oriented polypropylene films with a matt cover layer. The cover layer consists of propylene copolymers and/or terpolymers and an HDPE. The films are characterised by a low gloss and a high haze, whereby the matt appearance is ensured.

U.S. Pat. No. 5,500,265 also describes a peelable film.

These known peelable films have the disadvantage that a peelable cover layer inherently has a higher haze and a lower gloss than a sealable cover layer. Since generally the peelable cover layer must be applied on both sides to allow a sealing of peel layer to peel layer, the known peel films have an insufficient transparency and insufficient gloss. It suffices to apply the peel layer on one side only, if in the manufacture of the packaging this peel side of the film is sealed against itself. In packagings that require what is known as an "Overlap" sealing seam (A/B-sealing), this film structure is not a solution, since the sealing of the peel layer against the opposing seal layer leads to very high sealing seam strengths and thus the controlled opening of the packaging is difficult.

It is also known in the art that the high demands on the gloss in high-quality polypropylene films is met generally only by cover layers made of propylene homopolymer. However, these homopolymer cover layers are not sealable.

There is a need for high-quality packaging films which better meet these diverse requirements compared to the peelable transparent films previously known in the prior art. It is therefore an object of the present invention to provide a film which can be easily and reliably processed into a peelable packaging. The film should also be suitable for packagings with an "overlap" sealing seam, i.e. the required sealing seam strength and the good peelability should be provided with a sealing of the opposing cover layers.

The object of the present invention thus lies in providing a transparent, peelable film which offers a wide processing window. The peelability of the sealed film is less critically dependent on the seal initiation temperature or variations in film quality, that is the seal should lead within a wide temperature range to a sufficient strength of the sealing seam on the one hand and good peelability on the other. In particular, the strength of this sealing seam over a seal initiation temperature range of preferably 30° C. should lie in a range of 0.4 to 1.5 N/15 mm, so that a packaging can be opened without destroying the film structure or without undirected tear propagation. At the same time, the other properties, for example the printability of the film, must not be adversely affected. A good transparency and a good gloss at least on one side are additionally desirable.

The object forming the basis of the invention is achieved by peelable transparent multilayered polyolefin films formed of a transparent base layer and a first cover layer I and a second sealable cover layer II, wherein (I) the first cover layer I contains a mixture of
(a) at least one propylene copolymer I and/or propylene terpolymer I from propylene, ethylene and/or butylene units and
(b) at least one ethylene-butylene copolymer and
the surface of this cover layer I has a roughness of 0.1 to <2 µm at a cut-off of 0.25 mm, measured according to ISO4287, and
(II) the second sealable cover layer II contains a mixture of
(a) a propylene homopolymer and
(b) a propylene copolymer II having a seal initiation temperature of 105 to 135° C.,
wherein the sealable cover layer II contains at least 70 wt %, based on the weight of the cover layer II, of the propylene homopolymer.

Surprisingly, the modification of propylene homopolymer cover layer II with a comparatively small amount of a sealable propylene copolymer II enables a sealing of this cover layer II against the peelable cover layer I, if a propylene copolymer II with a seal initiation temperature of 105 to 135° C. is selected as additive. Surprisingly, the transparency and the gloss of the film on the surface of the cover layer II are only insignificantly impaired due to the addition of this propylene copolymer II, so that the film overall meets the high requirements in terms of optics to a good extent. The cover layer I can be sealed against the cover layer II within a wide temperature range. Within this temperature range, sufficiently strong sealing seams can be achieved. Simultaneously, the sealing seam (I/II) can be opened in a controlled manner so that a peelable packaging can be comparatively easily produced from the film. Thus, the film offers a combination of properties, which previously could not be realised on a film this way.

The transparent base layer of the multilayered film according to the invention essentially contains a polyolefin, preferably a propylene polymer, and optionally other additives, each in effective amounts. In general, the base layer contains at least 70 to 100 wt %, preferably 85 to 99 wt %, in particular 95 to 99 wt % of the polyolefin, preferably propylene homopolymer, based on the weight of the base layer.

Suitable polyolefins are preferably propylene polymers. These propylene polymers contain 90 to 100 wt %, preferably 95 to 100 wt %, particularly 98 to 100 wt of propylene units and have a melting point of 150° C. or higher, preferably 155 to 170° C., and in general a melt flow index of 0.5 to 12 g/10 min, preferably 2 to 8 g/10 min at 230° C. and a force of 2.16 kg (ISO 1133-1). Isotactic propylene homopolymer having an atactic content of 15 wt % and less, copolymers of ethylene and propylene having an ethylene content of 10 wt % or less, copolymers of propylene with C4-C8 olefins having an olefin content of 10 wt % or less, terpolymers of propylene, ethylene and butylene having an ethylene content of 10 wt % or less and having a butylene content of 15 wt % or less are preferred propylene polymers for the base layer, wherein isotactic propylene homopolymer is particularly preferred. The weight percents specified relate to the respective polymers.

Furthermore, a mixture of said propylene homopolymers and propylene copolymers and/or propylene terpolymers is suitable. Optionally, other polyolefins from monomers having 2 to 6 carbon atoms in the base layer may be contained. Other polyolefins are, for example, polyethylenes, in particular HDPE, LDPE, VLDPE and LLDPE. Particularly preferably, the base layer contains at least 90 wt % propylene homopolymers and at most 10 wt %, preferably at least 95 wt % propylene homopolymers and a maximum of 5 wt % of the co- and/or terpolymers and/or other polymers.

A transparent base layer is of course substantially free (<1 wt %, based on the weight of the base layer) of pigments and vacuole-initiating particles which are generally used for white opaque films.

The film according to the invention, in addition to the transparent base layer, also comprises a first peelable cover layer I and a second sealable cover layer II. A cover layer within the meaning of the present invention is an outer layer so that the outer surface of the particular cover layer forms one of the two film surfaces. Preferably, the cover layers I and II are layers coextruded together with the base layer.

The peelable cover layer I contains, as components essential to the invention, a propylene copolymer and/or propylene terpolymer I from propylene, ethylene and/or butylene units and an ethylene-butylene copolymer. Generally, the peelable cover layer I contains at least 70 to 99 wt %, preferably 75 to 97 wt %, in particular 80 to 95 wt % of the propylene copolymers and/or propylene terpolymers I and 1 to 30 wt %, preferably 3 to 25 wt %, particularly 5 to 20 wt % of ethylene-butylene copolymer, in each case based on the weight of the peelable cover layer I, and, optionally, additionally conventional additives in effective amounts in each case, wherein the proportion of copolymer and/or terpolymer is reduced accordingly in these embodiments in favour of the additives.

Suitable propylene copolymers or propylene terpolymers I are composed of ethylene, propylene or butylene units, wherein terpolymers I contain three different monomers. The composition of the copolymers or terpolymers I from the respective monomers may vary within wide limits. In general, the copolymers and/or terpolymers contain more than 50 wt %, preferably more than 60 to <100 wt % of propylene units, i.e. are propylene copolymers and/or propylene terpolymers with ethylene and/or butylene units as comonomers. The proportion of comonomers is randomly distributed, and therefore these polymers are also referred to as random copolymers or random terpolymers.

Propylene copolymers I generally contain at least 65 wt %, preferably 70 to 97 wt % of propylene units and at most 35 wt %, preferably 3 to 30 wt % of ethylene or butylene units as comonomer. Propylene terpolymers I generally contain 65 to 96 wt %, preferably 72 to 93 wt % of propylene units and 3 to 34 wt %, preferably 5 to 26 wt % of ethylene units and 1 to 10 wt %, preferably 2 to 8 wt % of butylene units. The copolymers and terpolymers I described above generally have a melt flow index of 1.5 to 30 g/10 min, preferably from 3 to 15 g/10 min; wherein the melt flow indices are measured at 230° C. and a force of 2.16 kg (ISO 1133-1). The melting point of the copolymers or terpolymers I is in the range of 120 to 140° C.

As appropriate, the above-mentioned propylene copolymers and propylene terpolymers I can be mixed together. Here, the proportions of copolymer to terpolymer may vary within any limits. This mixture is then used in the peelable cover layer, in the above amounts described for the respective copolymers and terpolymers I.

The second component of the peelable cover layer I essential to the invention is an ethylene-butylene copolymer. The cover layer I formed of the mixture of propylene copolymers and/or propylene terpolymers I with the ethylene-butylene copolymer does not form a significant surface roughness. The surface roughness Rz of the cover layer I measured in accordance with ISO4287 of the first cover layer I lies generally in a range of 0.1 to <2 µm, preferably 0.2 to 1.5 µm, especially 0.3 to 1.0 µm, at a cut-off of 0.25 mm.

The ethylene-butylene copolymer contains, based on the copolymer, a proportion of <50 wt %, preferably 10 to 45 wt %, of butylene, preferably unbranched 1-butene as comonomer. The ethylene-butylene copolymer generally has a melt flow index (MFI) of greater than 0.5 to 15 g/10 min, preferably 1.0 to 10 g/10 min, in particular from 1.0 to 5 g/10 min (measured at 2.16 kg/190° C.). The maximum melting point of the ethylene-butylene copolymer, as measured using DSC (maximum of the melting curve, heating rate 20° C./min), is 50 to 110° C., preferably 60 to 90° C. Preferably, the maximum melting point thus determined is <100° C., preferably <90° C. The density, measured at 23° C. according to ISO 1183, is in the range of >0.82 to 0.92 g/cm$^3$, preferably in the range of 0.85 to 0.90 g/cm$^3$. It is thus a VLDPE or a ULDPE, preferably a ULDPE. The ethylene-butylene copolymer in the DSC preferably and typically demonstrates a very wide continuous melting range beginning at a lower limit of at least 30° C., preferably at least 35° C., up to an upper limit of 100° C., preferably of 90° C., wherein this melting range includes 90% of the material, based on the area of the DSC curve (curve integral). Such DSC curves are typical of UDLPEs. It is also possible to pre-treat an ethylene-butylene copolymer by peroxide degradation, for example of a primary, narrowly distributed metallocene ethylene-butylene copolymer. A peroxide degradation increases the melt flow rate and widens the melting range. In this way, the wide melting range of a ULDPE of much lower density can be obtained also with, for example, a slightly higher density VLDPE. Such peroxide degradation of polymers is a measure which is well known to a person skilled in the art.

Preferably, the ethylene/butylene copolymer is product polymer produced with at least one organometallic single-site catalyst, preferably polymer produced with at least one metallocene. Preferably, and in respect of the lowest possible roughness, the ethylene/butylene copolymer is 'compatible' with the copolymer or terpolymer I of the cover layer I. In the sense of the present invention, compatible means that the ethylene/butylene copolymer is miscible with isotactic polypropylene in the amorphous state, or at room temperature in the amorphous region. For compatibility, it is not necessary that the ethylene copolymer is completely and homogeneously miscible with the copolymer or terpolymer I. Preferably there is no homogeneous, complete miscibility. Rather, the cover layer I preferably and typically shows two separate phases (in TEM, after staining with ruthenium tetraoxide, see Nwabunma, Kyu et al. (ed.), Polyolefin Blends, John Wiley & Sons, 2008 Hoboken/NJ, p. 226-241). The structure of the mixture shows in electron micrographs that the isotactic polypropylene is miscible with the ethylene-butene copolymer only in the amorphous phase between the crystalline polypropylene lamellae, i.e. there is no complete phase separation present. The mixture of the cover layer I according to the invention differs from the mixtures of incompatible polymers known in the prior art, for example propylene polymer with incompatible HDPEs, which produce just increased surface roughnesses. Typically and preferably, in the mixtures of the present invention, crystalline lamellae of isotactic polypropylene protrude in the form of dendrites into the amorphous ethylene/butylene copolymer-rich phase (in the TEM image, the fine structure, see Nwabunma, p. 227, FIG. 9.2). Thus, in the case of a compatible polymer mixture, there is a low surface tension between the polymer phases and a good interfacial adhesion of the phase, with little or no coalescence. Compatibility in the present context also means that, unlike incompatible polymers, both polymer phases in the melt are completely miscible (above the UCST; detection by neutron scattering, SANS, see Nwabunma, ibid. p 226, Weimann et al, Macromolecules 30, 3650 (1997)).

In a particularly preferred embodiment, the cover layer I does not contain any LDPE, MDPE or HDPE admixtures, which, as polyethylenes incompatible with propylene polymers, are often used in the prior art for producing sealable, but matt cover layers with increased roughness. Also, neither the cover layer I nor the cover layer II preferably contains a poly-1-butene.

Particularly suitable is for example an ethylene/butylene copolymer having the trade name TAFMER A-4085 S by Mitsui Chemicals, Inc, which has a maximum melting point of about 86° C., a peak melting point of about 76° C., and an MFI of 3.6 g/10 min. The density measured at 23° C. according to ISO 1183 is in the range of >0.85 to 0.92 g/cm$^3$, and typically is about 0.88 g/cm$^3$.

Preferably, the cover layer I contains no admixtures in the form of solid fillers selected from the group of solid particles and/or fibres, in particular no admixtures in the form of solid fillers formed of inorganic material.

The propylene copolymers and/or terpolymers I are mixed with the ethylene-butylene copolymer. This mixture can be present as a mechanical mixture of granules or as a blend. The mixture of components generally shows two separate melt peaks in a melting graph recorded by DSC. The first melting peak is preferably in the range from 105 to 135° C., and the second melting peak is in the range of 120 to 140° C.

The thickness of the peelable cover layer I is selected independently of the thickness of the other layers and is preferably in the range of 0.5 to 1.5 µm, preferably 0.6 to 1.2 µm, preferably 0.7 to 1 µm.

The cover layer I optionally additionally contains conventional additives in effective amounts, generally neutralising agent and stabiliser. Antiblocking agents and/or slip agents are also preferably added. The nature and amount of these additives are described later in detail.

The cover layer II I contains, as components essential to the invention, substantially propylene homopolymer and a propylene copolymer II with an increased sealing initiation temperature.

Within the scope of the present invention it was surprisingly found that the film meets all the above-mentioned requirements in terms of transparency, gloss, seal area, sealing seam strength and peelability if the second cover layer II, in addition to the non-sealable propylene homopolymer, contains at least one propylene copolymer having a seal initiation temperature of 105 to 135° C., preferably 110 to 125° C., in particular 110 to 120° C. In general, the second cover layer contains at least 70 to 98 wt %, preferably 80 to 95 wt %, in particular 85 to 95 wt % propylene homopolymer and 2 to 30 wt %, preferably 5 to 20 wt %, in particular 5 to 15 wt % of the propylene copolymer II, in each case based on the weight of the second cover layer II.

The propylene homopolymer of the cover layer II contains generally 95 to 100 wt %, particularly 98 to 100 wt % of propylene units and has a melting point of 155° C. or higher, preferably 158 to 170° C., and generally has a melt flow index of 0.5 to 12 g/10 min, preferably 2 to 8 g/10 min at 230° C. and a force of 2.16 kg (ISO 1133-1). Propylene homopolymers are generally isotactic polymers having an atactic content of 15 wt % and less.

Suitable propylene copolymers II with said seal initiation temperature are preferably formed of propylene and butylene units. In general, the copolymers contain at least 60 wt % of propylene units, i.e. are propylene copolymers with at most 40 wt butylene units as comonomers ($C_3C_4$ copolymers). The proportion of comonomer is randomly distributed, which is why these polymers are also referred to as random copolymers. These copolymers are preferably produced with a Ziegler Natta catalyst. The $C_3C_4$ copolymers II preferably contain at least 65 wt %, in particular 70 to 97 wt % of propylene, and preferably at most 35 wt %, in particular 3 to 30 wt % butylene as comonomer. The melt index of the C3C4 copolymers is generally 0.1 to 20 g/10 min (230° C., 2.16 kg), preferably 3 to 15 g/10 min. The melting point is generally in a range from 130 to 146° C., preferably 135 to 145° C. The Vicat A temperature of these propylene copolymers II is preferably >100° C. The embodiments of the film with these $C_3C_4$ copolymers are characterised by particularly good peelability in relation to the cover layer I.

Within the scope of the present invention it has been found that the incorporation of propylene-ethylene copolymers or propylene-ethylene-butylene terpolymers having a seal initiation temperature of below 105° C. in the propylene homopolymer of the cover layer II does not achieve the object of the present invention. It has been found that these polymers in small amounts do not lead to any sealing or lead only to very low sealing seam strengths. By increasing the amount, the sealing seam strength can indeed be increased, but at the same time the peelability and the transparency of the film will be severely impaired. These polymers therefore could not be used to provide a mixture for the cover layer II or a film which meets all requirements. Polymers having a seal initiation temperature of more than 135° C. were also found to be unsuitable, since no sealing seam strength could be achieved in respect of the layer I. It is therefore essential to the invention that the cover layer contains the described mixture of the propylene homopolymer and the propylene copolymer II having a seal initiation temperature of 105 to 135° C.

The seal initiation temperature of the propylene copolymer II, preferably $C_3C_4$ copolymer II, is understood to be the seal initiation temperature which is measured on a reference film. This reference film is a biaxially stretched film, which is composed of a base layer of propylene homopolymer and a first cover layer. The first cover layer is constructed to an extent of 100 wt from the propylene copolymer II to be determined, preferably $C_3C_4$ copolymer. The first cover layer has a thickness of about 1.2 µm, so that the measured value is independent of the usual minor fluctuations in thickness. A second cover layer may be applied optionally on the opposite side of the base layer, as this does not affect the seal initiation temperature of the first cover layer. The first cover layer of the reference film formed of C3C4 copolymers, however, should not contain additives such as antiblocking agents or slip agents, which could affect the seal initiation temperature. The seal initiation temperature is determined by sealing this reference film, wherein the first cover layer formed of the polymer to be examined is sealed against itself. With regard to the sealing and the measurement procedure, the approach adopted is the same as that described in detail in the section relating to the measurement methods.

Propylene-butylene copolymers which have a seal initiation temperature of 115 to 120° C. and a melting point of 138 to 142° C. are particularly advantageously used. Preferably, these propylene-butylene copolymers have a melting enthalpy ΔH of from 40 to 80 J/g, particularly from 50 to 75 J/g. A suitable commercial copolymer which is to satisfy these criteria is Adsyl 3C30FHP, for example.

The proportion of this propylene-butylene-copolymer is preferably in a range of 5 to 15 wt %, based on the weight of the cover layer II.

The cover layer II generally has a thickness of 0.1 to 2 µm, preferably 0.3 to 1.2 µm, in particular 0.5 to 0.8 µm.

It is known in the prior art that a cover layer formed of isotactic propylene homopolymer cannot be sealed against itself, nor against conventional sealable cover layers. Surprisingly, it has been found that the modification of a homopolymer cover layer with the described propylene copolymer II, preferably $C_3C_4$ copolymer II, provides the homopolymer cover layer with a sealability which allows a sufficient sealing seam strength in respect of the peelable cover layer I. Sealed packagings can thus be produced which provide sufficient protection for the packaged goods. It was originally expected that such sealability of a cover layer based on propylene homopolymer, if any, could only be achieved with very low-sealing copolymers in the homopolymer cover layer. Compared to other compositions, however, only the special combination according to the invention of the two cover layers I and II could be found, which may be sealed against each other so that on the one hand the required sealing seam strength and at the same time the peelability of the sealing seam is achieved. Here, with the combination according to the invention of the cover layer I and II, it is also possible to achieve this sealing seam strength on the one hand and the peelability on the other hand even certain variations of the seal initiation temperature. Thus, the manufacture of the peelable packaging is substantially improved and the scrap constituted by packagings that do not meet the quality requirements is significantly reduced. The requirements with regard to gloss and optics are additionally also very well satisfied. The film according to the invention thus provides a variety of required properties that could not be shown in this combination with films according to the prior art.

Figure 1:
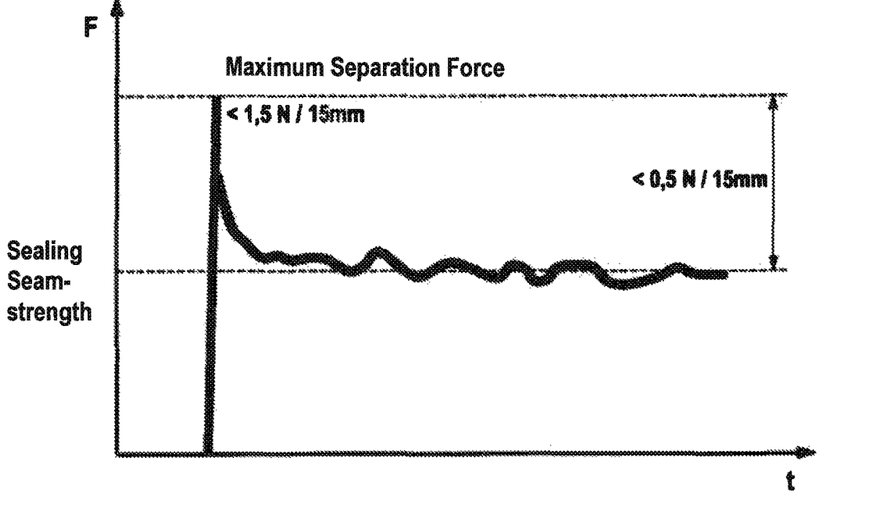
FIG. 1 illustrates the relationship of sealing seam-strength versus maximum separating force.

Peelability means, for the purposes of the present invention, that the sealing seam can be checked qualitatively and uniformly lifted off in order to separate the sealed film plies. When peeling, a separation of the seam by lifting off with a force that is as uniform as possible is possible once the separating force has been overcome at the start of the peeling process. The initial (maximum) separating force is preferably at most 1.5 N/15 mm (upper line FIG. 1). The subsequently required separating force to uniformly lift off the seam is lower than the initial separating force and corresponds to the sealing seam strength (lower line FIG. 1). Preferably, the initial separating force and subsequent separating force (sealing seam strength) differ from one another by no more than 0.5N/15 mm. FIG. 1 illustrates these relationships.

The total thickness of the film may vary within wide limits and is based on the intended use. The preferred embodiments of the film according to the invention have total thicknesses of 10 to 100 µm, wherein 15 to 50 µm, particularly 20 to 40 µm, are preferred.

Preferred embodiments of the film are composed of three layers and consist of the base layer and the cover layers I and II on both sides. The base layer is in the sense of the present invention the layer which makes up more than 50% of the total thickness of the film. Its thickness results from the difference between the total thickness and the thickness of the applied cover layer/s and can therefore vary within wide limits analogously to the total thickness. The cover layers I and II form the outermost layers of the film. Intermediate layers may optionally be additionally attached between the respective cover layer or the cover layers.

In order to yet further improve certain properties of the polypropylene film according to the invention, both the base layer and the two cover layers may contain conventional additives, each in an effective amount, preferably hydrocarbon resin and/or antistatic agents and/or antiblocking agents and/or slip agents and/or stabilisers and/or neutralising agents, which are compatible with the polymers of the base layer and the cover layer(s), with the exception of antiblocking agents, which are generally incompatible. All amounts in the following embodiment in weight percent (wt %) relate to the layer or layers to which the additive may be added.

Preferred antistatic agents are alkali alkanesulfonates, polyether-modified, i.e. ethoxylated and/or propoxylated, polydiorganosiloxanes (polydialkylsiloxanes, polyalkylphenyl siloxanes, and the like) and/or the substantially straight-chain and saturated aliphatic, tertiary amines containing an aliphatic group having 10 to 20 carbon atoms, which are substituted with alpha-hydroxy (C1-C4) alkyl groups, wherein N,N-bis-(2-hydroxyethyl) alkylamines having 10 to 20 carbon atoms, preferably 12 to 18 carbon atoms, in the alkyl group are particularly suitable. The effective amount of antistatic agent is in the range of 0.05 to 0.7 wt %. For the present invention it is particularly preferred to add tertiary aliphatic amines to the cover layer(s) in an amount of 0.4 to 0.6 wt %.®Armostat 300 is a particularly preferred antistatic agent.

Slip agents are higher aliphatic acid amides, higher aliphatic acid esters, waxes and metal soaps and polydimethylsiloxanes. The effective amount of slip agent is in the range of 0.1 to 3 wt %. Particularly suitable is the addition of higher aliphatic acid amides in the range of 0.15 to 0.25 wt % in the base layer and/or the cover layers. A particularly suitable aliphatic acid amide is erucamide. The addition of polydimethylsiloxanes is preferred in the range from 0.3 to 2.0 wt %, in particular polydimethylsiloxanes having a viscosity of 10,000 to 1,000,000 $mm^2/s$.

The conventional stabilising compounds for ethylene, propylene and other olefin polymers may be used as stabilisers. Their added amount is between 0.05 and 2 wt %. Particularly suitable are phenolic stabilisers, alkali/alkaline earth stearates and/or alkali/alkaline earth carbonates. Phenolic stabilisers are preferred in an amount of 0.1 to 0.6 wt %, in particular 0.15 to 0.3 wt %, and having a molar mass of more than 500 g/mol. Pentaerythrityl-tetrakis-3-(3,5-di-tert-butyl-4-hydroxyphenyl) propionate, or 1,3,5-trimethyl-2,4,6-tris(3,5-di-tert-butyl-4-hydroxybenzyl) benzene are particularly advantageous.

Suitable antiblocking agents are inorganic additives such as silicon dioxide, calcium carbonate, magnesium silicate, aluminium silicate, calcium phosphate and the like and/or incompatible organic polymers such as polyamides, polyesters, polycarbonates and the like, with silicon dioxide and calcium carbonate being preferred, and also organic polymers. The effective amount of antiblocking agent is in the range of 0.1 to 7 wt %, preferably 0.5 to 5 wt %. The average particle size is 1 to 6 µm, in particular 2 to 5 µm, wherein particles having a spherical shape, as described in EP-A-0 236 945 and DE-A-38 01 535 are particularly suitable.

Neutralising agents are preferably calcium stearate and/or calcium carbonate having a mean particle size of at most 0.7 µm, an absolute particle size of less than 10 µm, and a specific surface area of at least 40 $m^2/g$.

The invention further relates to a method for producing the multilayered film according to the invention by the coextrusion process known per se.

Within the scope of this method, an approach is adopted such that the melts corresponding to the individual layers of the film are coextruded through a flat die, the resultant film is drawn off on one or more rolls for solidification, the film is then biaxially stretched (oriented), the biaxially stretched film is heat-fixed and, where appropriate, is treated on the surface layer intended for treatment.

The biaxial stretching (orientation) can be carried out simultaneously or sequentially, wherein sequential biaxial stretching, in which the film is stretched first longitudinally (in the machine direction) and then transversely (perpendicularly to the machine direction), is preferred.

First, as is usual in the case of a coextrusion process, the polymer or polymer mixture of the individual layers is compressed in an extruder and liquefied, wherein any additives added can be contained already in the polymer. The melts are then pressed together and simultaneously through a flat die (slot die), and the extruded multilayered film is drawn off on one or more take-off rolls, wherein it cools and solidifies. It has proven to be particularly favourable if the take-off roll or rolls, by means of which the extruded film is also cooled and solidified, are held at a temperature of 10 to 90° C., preferably 20 to 60° C.

Preferably, the resultant film is then stretched longitudinally and transversely to the extrusion direction, which results in an orientation of the molecular chains. In the longitudinal direction the film is preferably stretched 4:1 to 7:1, and in the transverse direction it is preferably stretched 6:1 to 11:1. The longitudinal stretching is generally carried out at a temperature of less than 140° C., preferably in the range of 115 to 135° C., and the transverse stretching is carried out at a temperature greater than 140° C., preferably at 145 to 160° C. The longitudinal stretching process is expediently carried out using two rolls running at different speeds in accordance with the desired stretching ratio, and the transverse stretching is carried out with the aid of an appropriate tenter frame.

The biaxial stretching of the film is followed by the heat-fixing of the film (heat treatment), the film being held approximately for 0.5 to 10 s at a temperature of 110 to 150° C. The film is then wound up in a conventional manner using a winding device.

Optionally, as mentioned above, after the biaxial stretching, one or both surface/s of the film can be subjected to a plasma, corona or flame treatment by one of the known methods. The treatment intensities are within the usual range, wherein 38 to 45 mN/m are preferred.

For flame treatment with a polarised flame (see U.S. Pat. No. 4,622,237), an electric DC voltage is applied between a burner (negative pole) and a chill roll. The magnitude of the applied voltage is between 500 and 3,000 V, and is preferably in the range 1,500-2,000 V. The applied voltage gives the ionised atoms an increased acceleration, so that they impinge at higher kinetic energy on the polymer surface. The chemical bonds within the polymer molecule are more easily broken, and the formation of free radicals proceeds more rapidly.

For the alternative corona treatment, the film is passed between two conductor elements serving as electrodes, wherein between the electrodes such a high voltage, usually an alternating voltage (about 10,000 V and 10,000 Hz) is applied, that spray or corona discharges can occur. The spray or corona discharge ionises the air above the film surface and reacts with the molecules of the film surface so that polar inclusions are formed in the essentially nonpolar polymer matrix.

The multilayered film according to the invention can be sealed in a wide temperature range, for example of 120 to 150° C., and has a sealing seam strength in the range of 0.4 to 1.5 N/15 mm on. Simultaneously, the film has excellent peeling. When peeling, i.e. when opening the packaging, there is no uncontrolled ripping or tearing of the film.

It has been found that the peelable cover layer I can be surprisingly well sealed against the modified propylene homopolymer cover layer II, although cover layers made of propylene homopolymer per se are not sealable. Seal seam strengths from 0.4 to 1.5 N/15 mm can be achieved in a wide temperature range of 120 to 150° C. Surprisingly, the sealing seam strengths do not increase further even at relatively high seal initiation temperatures of about 140° C., and therefore a strength of 1.5 N/15 mm is not exceeded and a good peelability is given even after sealing at high temperatures.

The desired peelability is also provided here so that the packagings made of the film according to the invention can be easily opened in a controlled manner. It suffices to provide just a small addition of the propylene copolymer II in the polypropylene homopolymer cover layer II, so that gloss and transparency of the film are influenced only insignificantly on the whole. The gloss of the film on the surface of the cover layer II is generally in a range from 100 to 125 gloss units, and the transparency of the film is in a range of 1.5 to 2.5%. It is thus possible to provide a film which meets all requirements to a good level in terms of gloss, transparency, sealing seam strength and peelability. The object is achieved by a film structure which does not require special additional method steps such as coating, lamination or the like in order to produce a peelable packaging.

The invention will now be explained by the following examples.

EXAMPLE

After the coextrusion method a three-layered film was extruded from a slot die at an extrusion temperature of 260° C. This precursor film was first drawn off and cooled on a chill roll. Then, the precursor film was oriented in the longitudinal and transverse directions and finally fixed. The surface of the first cover layer I was pre-treated by corona to increase the surface tension. The three-layer film had a layer structure of the first cover layer I/base layer/second cover layer II. The individual layers of the film had the following composition. The values in wt % relate to the weight of the layer in question.

Base layer B:
99.75 wt %
propylene homopolymer (PP) having an n-heptane-soluble content of 4.5 wt % (based on 100% PP) and a melting point of 165° C. and a melt flow index of 3.2 g/10 min at 230° C. and 2.16 kg load (ISO 1133-1);
0.10 wt %
erucamide via Masterbatch Borealis HC 102 BF
0.15 wt %
N,N-bis(2-hydroxyethyl)-(C10-C20) alkylamine (®Armostat 300).

The cover layer I (peel layer)
90 wt %
a random ethylene-propylene-butylene terpolymer from the company Lyondell Basell (Adsyl 5C39F)
10 wt %
an ethylene-butylene copolymer from the company. Mitsui (Tafmer A 4085 S) having a melting point of 67° C. and a melt flow index MFR (at 190° C., 2.16 kg load) of 3.6 g/10 min.

The cover layer II (glossy side)
90 wt %
propylene homopolymer (PP) having an n-heptane-soluble content of 4.5 wt % (based on 100% PP) and a melting point of 165° C.; and a melt flow index of 3.2 g/10 min at 230° C. and 2.16 kg load (ISO 1133-1);
10 wt %
a propylene-butylene copolymer from the company. Lyondell Basell (Adsyl 3C 30 FHP)

All layers contained 0.12 wt % pentaerythrityl-tetrakis-4-(3,5-di-tert-butyl-4-hydroxyphenyl) propionate (®Irganox 1010) as well as 0.06 wt: % calcium stearate as neutralising agent.

In the production of the film, the following specific conditions were chosen:
Extrusion:
Extrusion temperature 260° C.
Longitudinal stretching:
Stretching roll T=120° C.
Longitudinal stretching by a factor of 5
Transverse stretching: heating fields T=165° C.
Stretching fields T=158° C.
Transverse stretching by a factor of 9
Fixing:
Temperature T=140° C.
Corona treatment cover layer II:
Voltage: 10,000 V.
Frequency 10,000 Hz The multilayered film thus produced had a surface tension of 40 to 41 mN/m (cover layer II) directly after production. The film was about 20 µm thick, wherein the thickness of the cover layer I was about 0.7 µm and the thickness of the cover layer II was about 0.5 µm.

Comparative Example 1

A film was prepared as described in Example 1. In contrast to Example 1, both cover layers I and II were made of the terpolymer from Lyondell Basell with trade name Adsyl 5C39 F. The remainder of the composition and the process conditions were unaltered compared with Example 1.

Comparative Example 2

Comparative Example 2 was prepared as described in Example 1. In contrast to Example 1, the cover layer A was made of a conventional terpolymer from Lyondell Basell with trade name Adsyl 5C 39 F, while polypropylene homopolymer from Lyondell Basell with the name Moplen HP 528 J was used for the second cover layer C. The remainder of the composition and the process conditions were unaltered compared with Example 1.

Comparative Example 3

Comparative Example 3 was prepared as described in Example 1. In contrast to Example 1, both cover layers contained a conventional copolymer of Ineos with the trade name Eltex P KS 414. The remainder of the composition and the process conditions were unaltered compared with Example 1.

The following measurement methods were used for characterisation of the raw materials and the films:

Melt Flow Index

The melt flow index of the propylene polymers was measured according to ISO 1133-1 at 2.16 kg load and 230° C. The melt flow index of the ethylene-butylene copolymer was measured according to ISO 1133-1 at 2.16 kg load and 190° C.

Peelability

Peelability preferably means that, upon separation of the sealed test strips (sealing time 0.5 s and sealing pressure 1.5 N/cm$^2$), the maximum initial separating force is at most 1.5 N/15 mm and the separating force during the further separation process drops by a maximum of 0.5 N/15 mm (compared to said maximum value).

Haze

Haze is measured according to ASTM D 1003-77.

The table below summarises the properties of the multilayered films of the examples.

TABLE 1

| | Cover layer | Layer thickness | Peelability | Haze | Gloss | Sealing of CL I with against CL II at 110 to 150° C. Sealing pressure 1.5 N/cm$^2$, sealing time 0.5 s, sealing seam strength in N/15 mm | | | | |
|---|---|---|---|---|---|---|---|---|---|---|
| | | | | | | 110° C. | 120° C. | 130° C. | 140° C. | 150° C. |
| Example I | CL I | 0.7 μm | ++ | 1.7% | 112 | | 0.47 | 0.50 | 0.59 | 0.80 |
| | CL II | 0.5 μm | | | 118 | | | | | |
| CE1 | CL I | 0.7 μm | -- | 1.4% | 120 | 0.57 | 1.23 | 1.94 | 2.50 | 2.64 |
| | CL II | 0.5 μm | | | 115 | | | | | |
| CE2 | CL I | 0.7 μm | o | 1.1% | 122 | | | | 0.18 | 0.76 |
| | CL II | 0.5 μm | | | 148 | | | | | |
| CE3 | CL I | 0.7 μm | - | 1.3% | 128 | | 0.36 | 1.21 | 2.22 | 2.47 |
| | CL II | 0.5 μm | | | 134 | | | | | |

CL = cover layer
CE = comparative example

Melting Points

DSC measurement, maxima of the melting curve, heating rate 20° K/min.

Gloss

The gloss was determined according to ISO 2813. The reflector value was measured as an optical parameter for the surface of a film. The angle of incidence was set at 20°. A light beam hits the flat test surface at the set angle of incidence and is reflected or scattered by said surface. The light beams incident on the photoelectronic receiver are displayed as a proportional electrical value. The measurement value is dimensionless and is expressed in gloss units and together with the angle of incidence.

Seal Seam Strength

To determine the sealing seam strength of the film, two film strips 15 mm wide are cut and placed on one another with the respective cover layers to be tested and are sealed at a temperature in a range of 110 to 150° C., with a sealing time of 0.5 s and at a sealing pressure of 1.5 N/cm$^2$ (apparatus: Brugger NDS, sealing jaw heated on one side). The sealing seam strength, i.e. the force required to separate the test strips, is determined with a tensile tester at a peel-off rate of 200 mm/min, wherein the sealing seam plane forms a right angle with the direction of pull.

Determination of the Seal Initiation Temperature

Two film strips are cut and laid on one another with the respective cover layers to be tested. With the sealing device HSG/ETK from the company Brugger, sealed specimens are prepared by sealing the superimposed strips at different temperatures with the aid of two heated sealing jaws (20 mm×100 mm) at a sealing pressure of 10 N/cm$^2$ and a sealing time of 0.5 s. From the sealed specimens, test strips are cut having a 15 mm width. The sealing seam strength, i.e. the force required to separate the test strips, is determined with a tensile tester at 200 mm/min peel-off speed, wherein the sealing seam plane forms a right angle with the direction of pull. The seal initiation temperature is the temperature at which a sealing seam strength of at least 1.0 N/15 mm is achieved.

The invention claimed is:

1. A peelable multilayered polyolefin film formed of a transparent base layer and a first cover layer I and a second sealable cover layer II, wherein
   (I) the first cover layer I contains a mixture of
      (a) at least one propylene copolymer from propylene and ethylene or butylene units and/or propylene terpolymer I from propylene, ethylene and butylene units, and
      (b) at least one ethylene-butylene copolymer
   and the surface of this cover layer I has a roughness Rz of 0.1 to <2 μm at a cut-off of 0.25 mm, measured according to ISO4287, and
   (II) the second sealable cover layer II contains a mixture of
      (a) a propylene homopolymer and
      (b) a propylene copolymer II having a seal initiation temperature of 105 to 135° C.;
   wherein the film has sealing seam strengths in a range of 0.4 to 1.5 N/15 mm when the cover layer I is sealed against the cover layer II with a sealing pressure of 1.5 N/cm$^2$ and a sealing time of 0.5 sec in a temperature range of 120 to 150° C.

2. The multilayered film according to claim 1, wherein the cover layer I contains 70 to 99 wt % of propylene copolymer and/or propylene terpolymer and 1 to 30 wt % of ethylene-butylene copolymer.

3. The multilayered film according to claim 1, wherein the ethylene-butylene copolymer contains 1 to 8 wt %, based on the polymer, of butylene units.

4. The multilayered film according to claim 1, wherein the ethylene-butylene copolymer has a melting point of 50 to 110° C.

5. The multilayered film according to claim 1, wherein cover layer II contains 5 to 20 wt % of the propylene copolymer II and 80 to 95 wt % of the propylene homopolymer.

6. The multilayered film according to claim 1, wherein the propylene copolymer II is a propylene-butylene copolymer having a butylene proportion of 5 to 15 wt %.

7. A packaging containing a multilayered film according to claim 1, wherein the packaging comprises an overlap seam at which the cover layer is sealed against the cover layer II.

8. The packaging according to claim 7, wherein the sealing seam strength of the sealing seam lies in a range of 0.4 to 1.5 N/15 mm.

9. A process for producing a packaging which comprises utilizing the multilayered film according to claim 1, and sealing the cover layer I against the cover layer II.

10. The process according to claim 9, wherein the cover layer I is sealed against the cover layer II at a sealing pressure of 1.5 N/cm$^2$ and a sealing time of 0.5 s in a temperature range of 120 to 150° C.

11. The process according to claim 10, wherein the sealing seam strength of the sealing of the cover layer I against the cover layer II lies in a range of 0.4 to 1.5 N/15 mm.

\* \* \* \* \*